United States Patent
Kühner et al.

[15] 3,701,480
[45] Oct. 31, 1972

[54] APPARATUS AND PROCESS FOR ATOMIZING LIQUIDS, PARTICULARLY CARBON BLACK RAW MATERIALS

[72] Inventors: Gerhard Kühner; Heinrich Sauer; Gerhard Jager, all of Grossauheim; Gerhard Dusing, Wolfgang kreis Hanau, all of Germany

[73] Assignee: Deutsche Gold- und Silber-Scheideanstalt vormals Roessler, Frankfurt (Main), Germany

[22] Filed: May 26, 1971

[21] Appl. No.: 147,248

Related U.S. Application Data

[63] Continuation of Ser. No. 801,554, Feb. 24, 1969, abandoned.

[30] Foreign Application Priority Data

Feb. 22, 1968 Germany..........P 16 25 206.5

[52] U.S. Cl. ...............239/420, 239/422, 239/424
[51] Int. Cl......F23d 11/16, F23d 13/40, F23d 15/00
[58] Field of Search ..239/418, 420 O, 424 X, 422 X, 239/434.5

[56] References Cited

UNITED STATES PATENTS

| | | | |
|---|---|---|---|
| 622,146 | 3/1899 | Heysel | 239/420 X |
| 1,279,315 | 9/1918 | Foerst | 239/424 |
| 1,398,397 | 11/1921 | Ryder et al. | 239/424 |
| 1,989,696 | 2/1935 | Kelley | 239/424 |
| 2,532,851 | 12/1950 | Meyer | 239/420 X |
| 2,600,040 | 6/1952 | Widmayer | 239/434.5 X |
| 2,808,294 | 10/1957 | Tamminga | 239/424 X |
| 3,112,882 | 12/1963 | Gilbert | 239/422 |

FOREIGN PATENTS OR APPLICATIONS 273,511 4/1914 Germany...................239/420

Primary Examiner—Lloyd L. King
Attorney—Cushman, Darby & Cushman

[57] ABSTRACT

There is provided an apparatus for atomizing a liquid by means of a gas comprising a nozzle at one end, a jacket pipe for gas contracting at said one end, a feed pipe for liquid arranged axially inside said jacket pipe and terminating therein as a constricted end, the length of both pipe ends in the axial direction being at most 10 times the inner diameter of the jacket tube. The apparatus is preferably used in the production of furnace blacks wherein the liquid hydrocarbon raw material is introduced into an atomizing stream of higher velocity and the dispersion is then separated into a reaction chamber.

7 Claims, 2 Drawing Figures

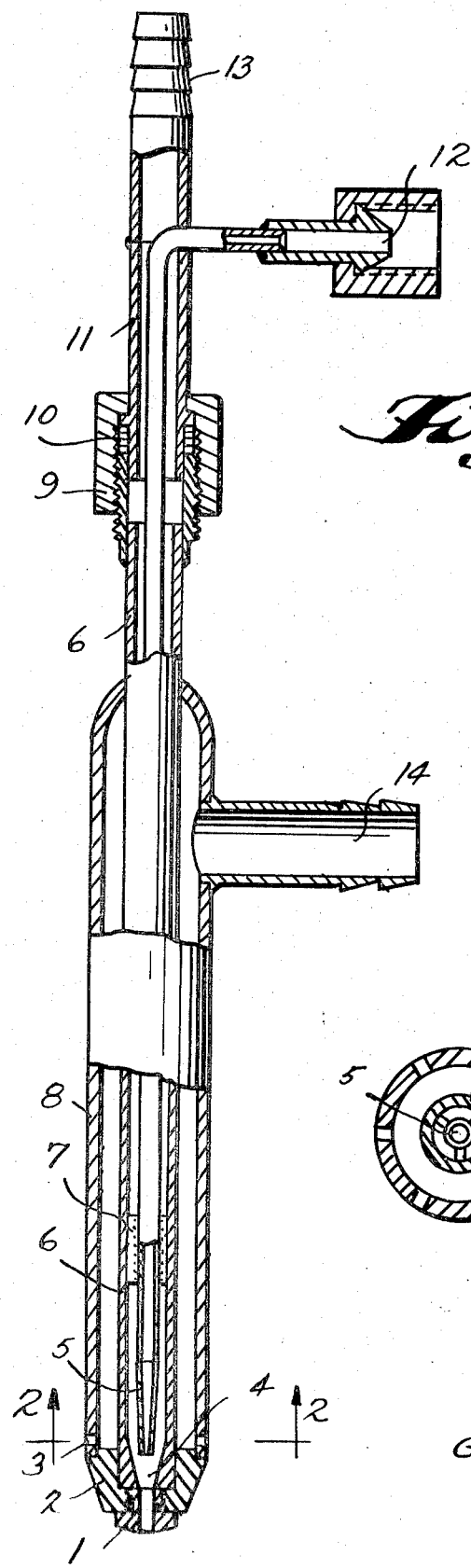
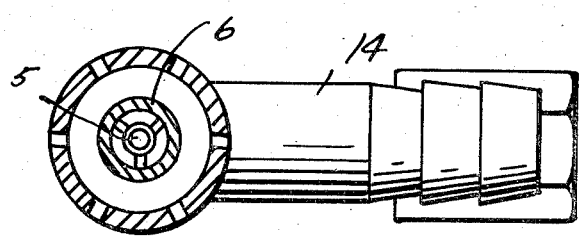
Fig. 1.
Fig. 2.
INVENTORS
GERHARD KUHNER
HEINRICH SAUER
GERHARD JAGER & GERHARD DUSING
BY Cushman, Darby & Cushman
ATTORNEYS

APPARATUS AND PROCESS FOR ATOMIZING LIQUIDS, PARTICULARLY CARBON BLACK RAW MATERIALS

This application is a continuation of application Ser. No. 801,554 filed Feb. 24, 1969, now abandoned.

The invention is concerned with an apparatus for atomizing liquids by means of a gas. It relates especially to a suitable atomizer construction as a burner for a plant for the production of furnace black and a feasible process for the production of furnace black with improved properties.

In the furnace black process a liquid hydrocarbon as the carbon black forming raw material is thermally decomposed or incompletely burned in a reaction chamber which, for example, is held at the necessary temperature by burning a fuel gas. Several apparatus are known for the supply of the liquid raw material into the reaction space, which must be done with quick and effective spraying.

A known design of such a burner consists of a central tube through which the liquid raw material flows and which is surrounded by a coaxial jacket pipe through which is introduced an atomizing gas. Both tubes are practically cylindrical and end in the same plane so that a free liquid jet is formed which becomes dispersed in droplets in front of the central pipe by the gas (the so-called support gas) flowing with constant velocity from the jacket tube.

According to another known design atomizing gas and liquid raw material enter through one or more openings in the reaction chamber after they have been mixed at a considerable distance away from the openings. Since the mixture must travel a long way from the mixing place to the exit there occurs in the feed pipe a segregation of the components which leads extensively to the formation of an adhering liquid film on the walls of the pipe while the gas preferably in the center of the pipe clears a flow channel and the liquid is removed from the walls and dispersed only at the end of the pipe.

By means of both of these burner constructions only the customary furnace blacks with a surface area below about 150 m$^2$/g can be economically produced. The production of blacks with higher specific surface areas would require substantially increased amounts of combustion air whereby the yield of blacks is very greatly reduced. For these reasons until now blacks with a specific surface area of more than about 150 m$^2$/g have not been produced on a technical scale in furnace devices.

It has now been found unexpectedly that blacks of very high specific surface area can be produced in good yields in furnace black devices, such blacks being useful as color blacks, if an apparatus according to applicants invention is used for atomizing of the liquid feedstock. Moreover, for blacks which are used for the reinforcing of rubber obvious advantages in the form of an increased structure and an essentially improved abrasion behavior are obtained.

The apparatus of the invention is characterized in that there is provided a jacket tube with a nozzle at one end, narrowing in the vicinity of the nozzle and a feed pipe for the liquid arranged within the jacket pipe and ending therein whereby the distance between both pipe ends in the axial direction is a maximum of 10 times the internal diameter of the jacket pipe. The minimum distance between the pipe ends is 0.1 times the internal diameter of the jacket pipe.

Appropriately the feed pipe for the liquid is movable along the longitudinal axis relative to the jacket pipe.

In a preferred form of the apparatus of the invention the feed pipe for the liquid ends in the tapering part of the jacket pipe near the nozzle.

Preferably the nozzle of the jacket has an orifice of a smaller diameter than the jacket pipe itself.

The nozzle can also have either a cylindrical shape or the shape of a venturi or laval nozzle.

The liquid raw material leaving the feed pipe, preferably under pressure, is dispersed into fine droplets by the bypassing gas of high velocity still within the jacket pipe. An especially intensive dispersion is achieved if the feed pipe is placed so that its orifice is in the region of the contraction of the jacket pipe, if necessary outside its central axis.

The velocity of the gas stream increases progressively with decreasing cross sectional area of the jacket pipe which improves the dispersion of the droplets of liquid.

The formed air-oil-mist is further accelerated by the nozzle at the end of the jacket pipe. This effect is especially strong if the nozzle is shaped as a venturi tube or a laval nozzle. So the mixture is transferred thereby with extraordinarily high velocity and turbulence into the reaction chamber. The entrance velocity and the spraying angle can be influenced by the choice of the nozzle diameter and the nozzle shape.

The technical advantage over the first of the previously described known burner designs arises from the acceleration of the gas-liquid-dispersion after the dispersion process.

The advantage in comparison with the second of the known burner constructions is that no oil film can adhere to the nozzle wall.

An additional advantage of working with a carbon black furnace equipped with the spraying apparatus of the invention over the known methods is that air can be used as an atomizing gas without difficulties, without danger that this air operates as a harmful component in the reaction mixture affecting yield and carbon black properties. It has been found unexpectedly that in contrast to the experiences made with conventional burners the amount of the atomizing air can be increased at the expense of the so-called combustion air otherwise added to the reaction chamber and supporting the heating flame in the furnace. Thereupon there is attained an increase in the specific surface area of the carbon black formed without loss of yield.

The apparatus of the invention creates the possibility of producing high activity color black in customary furnace black equipment with good yields without great construction changes to the furnace itself being necessary. Concerning rubber blacks there is obtained improved quality which especially concerns the structure and abrasion behavior. Of course all of the customary additional apparatus employed with customary burners can be used with the burner of the invention in so far as they concern the supply of a combustion gas. For example, a second outer jacket pipe can be used.

Accordingly, by use of the apparatus of the invention there is developed a process for the production of furnace color black of high surface area and high yield, by spraying into a gas stream of higher velocity, preferably under pressure a liquid hydrocarbon serving as raw material and dispersing these, whereby the resulting dispersion is first accelerated, and then sprayed into the reaction chamber.

The invention is furthermore directed to a process for the production of furnace black in good yields for incorporation into rubber achieving thereby high structure and also improved abrasion properties. The process comprises spraying into a gas stream of high velocity, preferably under pressure, a liquid feedstock and dispersing this, whereby the resulting dispersion is first accelerated, and then sprayed into the reaction chamber.

According to an especially preferred form of the process of the invention the hydrocarbon is introduced into the gas stream being in the state of the acceleration.

One can use air for the dispersion without the disadvantage with regard to the yield of the carbon black and its properties.

The invention will be understood best in connection with the drawings wherein.

FIG. 1 is a vertical elevation partly broken away in section of the apparatus; and FIG. 2 is a sectional view taken along the line 2—2 of FIG. 1.

Referring more specifically to FIG. 1 of the drawings the apparatus consists essentially of a liquid feed pipe 12 which at its orifice has a constriction 5 by which the exit velocity of the liquid becomes determined. This oil feed pipe enters in the back part of the apparatus in the jacket pipe 6 and 11 fixed for the gas feed and runs along the latter's middle axis through the centrally disposed clearance support 7 to the cylindrical bore hole of the nozzle 1.

The pipe 12 is bound firmly to the pipe 11 which forms the back continuation of the pipe 6 and can be moved with the help of the nut 9 and the distance ring 10 in the direction of the burner axis. The movability of pipes 12 and 11 relative to pipe 6 allows a regulation of the dispersing action inside pipe 6.

The atomizing gas enters through the nipple 13 in the jacket pipe 11 and gets into the space between the jacket pipe and the oil feed pipe in the forward part of the apparatus. At this point the jacket pipe 6 contracts as shown at 4, in which contraction the gas undergoes an acceleration. In the region of this contraction the liquid carbon black forming raw material comes out of the oil pipe 5 as shown in the drawing and becomes dispersed in the accelerating gas stream and finally leaves with high velocity from the nozzle 1 as a homogeneous atomized mixture. In place of the nozzle 1 there can be used other forms of nozzles such as venturi or laval nozzles which are examples of converging-diverging type nozzles.

The jacket pipe 6 has an inner diameter of 10 mm. for its major length and terminates in a contracting end 4 having a length in the axial direction of 12 mm and an inner diameter at its small end adjacent the nozzle of 3.5 mm. The feed pipe 12 has an inner diameter of 4 mm which was reduced to 2 mm at its constricted end 5. The end 5 has a length in the axial direction of 23 mm. The nozzle 1 has a orifice of 3.5 mm.

Of course it will be understood that the above given dimensions shall not limit the burner of invention dimensionally. The given dimensions rather represent one possible relationship between the construction parts of the burner. Test series have shown that the burner of invention can be enlarged without limitation to sizes which correlate with any given furnace without loosing its efficiency.

In the illustrated form of the apparatus for carrying out the invention the jacket pipe is surrounded by an outer jacket pipe 8 for the introduction of combustion gas. The combustion gas enters the apparatus at point 14 and leaves this through radially arranged bore hole 3 (FIG. 2).

The invention will be further explained by the following examples. In Examples 1 and 2 the effect of the new burner is compared in the production of carbon black with that of the second type of known burner mentioned at the beginning of the specification.

In the examples Russoel II is a coal and petroleum distillate which is a mixture consisting substantially of aromatic hydrocarbons boiling between 250° and 400° C.

EXAMPLE 1

For the production of a carbon black with reinforcing property for rubber the known burner of the prior art described at the second place of this disclosure was employed with the following reaction materials and quantities.

| Material | Amount |
| --- | --- |
| Russoel II | 25 kg/hour |
| Atomizing air (5 atmospheres absolute) fuel | 7 Nm³/hour |
| gas (city gas with an upper heating value of 4500 cal/Nm³) | 10 Nm³/hour |
| Combustion air | 96 Nm³/hour |

The production of carbon black amounted to 11.3 kilograms per hour which corresponds to a yield of 44.5 percent based on the Russoel II used. The testing of the carbon black obtained showed the following results.

| Carbon black properties | |
| --- | --- |
| Iodine surface area | 99 m²/g |
| DBP (dibutyl phthalate) oil adsorption | 1.35 ml/g |
| Rubber technical test results | |
| Modulus at 300 % elongation | 139 kg/cm² |
| Relative abrasion resistance | 100 % |

EXAMPLE 2

For the production of a carbon black with reinforcing properties on rubber there was employed a burner of the present invention in the form disclosed in the drawings with the following reaction materials and quantities.

| Material | Amount |
| --- | --- |
| Russoel II | 25 kg/hour |
| Atomizing air (5 atmospheres absolute) | 7 Nm³/hour |
| Fuel gas (city gas with an upper heating value of 4500 cal/Nm³) | 10 Nm³/hour |
| Combustion air | 95 Nm³/hour |

The production of carbon black amounted to 12.6 kilograms per hour which corresponds to a yield of 50.3 percent based on the added russoel. The testing of the carbon black obtained showed the following results.

| Carbon black properties | |
|---|---|
| Iodine surface area | 102 m²/g |
| DBP oil adsorption | 1.38 ml/g |
| Rubber technical test results | |
| Modulus at 300 % elongation | 145 kg/cm² |
| Relative abrasion resistance (relating to the value of Example 1) | 110 % |

The burner of the invention therefore permits the production of rubber blacks which are superior to the rubber blacks obtainable with conventional burner constructions in their properties and technical applications. Furthermore the carbon blacks are obtained in higher yields.

In the process described in Example 3 the burner of the invention was employed for the production of a rubber black with increased atomizing air at the expense of the combustion air.

EXAMPLE 3

There were used the following reaction materials and quantities

| Material | Amount |
|---|---|
| Russoel II | 25 kg/hour |
| Atomizing air (5 atmospheres absolute) | 16 Nm³/hour |
| Fuel gas (city gas with an upper heat value of 4500 cal/Nm³) | 10 Nm³/hour |
| Combustion air | 86.2 Nm³/hour |

The production of carbon black amounted to 14.2 kilograms per hour which corresponds to a yield of 56.5 percent based on the added russoel. The testing of the carbon black showed the following results.

| Carbon black properties | |
|---|---|
| Iodine surface area | 103 m²/g |
| Oil adsorption (dibutylphtalate) | 1.6 ml/g |
| Rubber technical test results | |
| Modulus at 300 % elongation | 155 kg/cm² |
| Relative abrasion resistance (relating to the value of Example 1) | 118 % |

As shown by a comparison with Example 2 the properties of the black prepared in Example 3 are even better if increased atomizing air is employed at the expense of combustion air.

In Examples 4 and 5 the effect of the new burner is compared in the production of carbon black with that of the second type of known burner mentioned at the beginning of the specification.

EXAMPLE 4

For the production of a color black there was employed the known burner of the prior art with the following reaction materials and quantities.

| Material | Amount |
|---|---|
| Russoel II | 25 kg/hour |
| Atomizing air (5 atmospheres absolute) | 7 Nm³/hour |
| Fuel gas (the same as in Example 1) | 10 Nm³/hour |
| Combustion air | 100 Nm³/hour |
| KCl additive in aqueous solution | 350 mg/kg russoel |

(The KCl was added as a 1 percent by weight aqueous solution in Examples 4 and 5).

The production of the carbon black amounted to 8.0 kilograms per hour which corresponds to a yield of 32.0 percent based on the added russoel. The testing of the carbon black obtained showed the following results.

| Carbon black properties | |
|---|---|
| Iodine surface area | 189 m²/g |
| Oil demand (according to the flowpoint method) | 262 % |
| Nigrometer scale | 88 |
| pH value | 9.1 |
| Volatile constituents | 3.4% |

EXAMPLE 5

For the production of a color black there was employed a burner of the present invention in the form disclosed in the drawings with the following reaction materials and quantities.

| Material | Amount |
|---|---|
| Russoel II | 25 kg/hour |
| Atomizing air (5 atmospheres absolute) | 7 Nm³/hour |
| Fuel gas (the same as in Example 1) | 10 Nm³/hour |
| Combustion air | 97 Nm³/hour |
| KCl additive in aqueous solution | 350 mg/kg Russoel |

The production of the carbon black amounted to 10.3 kilograms per hour which corresponds to a yield of 40.5 percent based on the added russoel. The testing of the carbon black obtained showed the following results.

| Carbon black properties | |
|---|---|
| Iodine surface area | 192 m²/g |
| Oil demand (according to the flowpoint method) | 305 % |
| Nigrometer scale | 83 % |
| pH value | 8.9 |
| Volatile constituents | 3.5 % |

The burner of the invention therefore permits the production of color blacks, which are superior to the color blacks, obtainable with conventional burner constructions in their properties and technical applications. Furthermore, the color blacks are obtained in higher yields.

The advantages obtained with the invention include:
1. Very fine distribution of the liquid in the gas is obtainable.
2. The apparatus is usable without essential changes in existing carbon black production plants.
3. It is possible to produce furnace color blacks with higher specific surface areas (greater than 150 m²/g) in good yields.
4. In the production of blacks for rubber reinforcement good yields, high structure and improved abrasion properties are obtained.
5. As the atomizing gas air can be used without drawback.

What is claimed is:

1. Apparatus for atomizing a liquid in a gas comprising a jacket pipe having a constant cross-section over its major axial length which tapers at one end for conducting said gas, a nozzle having a cylindrical orifice connected to the tapered end of said jacket pipe and a feed pipe having a constant cross-section over its major axial length enclosed and terminating with an internal taper within said jacket pipe adjacent said one end thereof for conducting said liquid toward said tapered end of said jacket pipe, the distance between the tapered, downstream ends of said jacket pipe and said feed pipe in the axial direction being in the range of one tenth to ten times the inner diameter of said jacket pipe whereby said liquid is accelerated in the tapered end of said feed pipe and then is atomized in said gas when said gas is under going acceleration due to the tapering of said jacket pipe and then the mixture is increased in velocity due to said nozzle.

2. An apparatus according to claim 1 wherein said feed pipe is movable along its longitudinal axis relative to said jacket pipe.

3. An apparatus according to claim 2 wherein said feed pipe ends in the tapered region of said jacket pipe.

4. An apparatus according to claim 1 wherein said feed pipe ends in the tapered region of said jacket pipe.

5. An apparatus according to claim 4 wherein said nozzle has a bore hole the open diameter of which is smaller than that of the jacket pipe.

6. An apparatus according to claim 5 wherein said nozzle has a cylindrical bore.

7. An apparatus according to claim 5 wherein said nozzle has a converging-diverging shape.

* * * * *